US012094374B2

(12) United States Patent
Zhang et al.

(10) Patent No.: US 12,094,374 B2
(45) Date of Patent: Sep. 17, 2024

(54) LED ILLUMINATED FLOOR TILE WITH GLASS COVER

(71) Applicant: SHENZHEN GLOSHINE TECHNOLOGY CO., LTD., Guangdong (CN)

(72) Inventors: Xianfeng Zhang, Guangdong (CN); Yongjun Zhang, Guangdong (CN); Guoqiang Li, Guangdong (CN); Zhiqiang Gao, Guangdong (CN)

(73) Assignee: SHENZHEN GLOSHINE TECHNOLOGY CO., LTD., Shenzhen (CN)

( * ) Notice: Subject to any disclaimer, the term of this patent is extended or adjusted under 35 U.S.C. 154(b) by 445 days.

(21) Appl. No.: 17/611,573

(22) PCT Filed: Dec. 9, 2020

(86) PCT No.: PCT/CN2020/134890
§ 371 (c)(1),
(2) Date: Nov. 16, 2021

(87) PCT Pub. No.: WO2021/115323
PCT Pub. Date: Jun. 17, 2021

(65) Prior Publication Data

US 2022/0230565 A1 Jul. 21, 2022

(30) Foreign Application Priority Data

Dec. 13, 2019 (CN) ......................... 201911284357.6

(51) Int. Cl.
*G09F 9/33* (2006.01)
*G09F 15/00* (2006.01)

(52) U.S. Cl.
CPC ............ *G09F 9/33* (2013.01); *G09F 15/0012* (2013.01)

(58) Field of Classification Search
CPC E04F 2290/026; E04F 15/02194; G09F 9/33; F21S 8/032; F21V 33/006; F21Y 2105/16
See application file for complete search history.

(56) References Cited

U.S. PATENT DOCUMENTS 4,907,361 A * 3/1990 Villard .................. G09F 19/228 362/153.1
7,204,604 B2 * 4/2007 Chou ................ G02F 1/133608 362/633

(Continued)

FOREIGN PATENT DOCUMENTS

CN 101176137 A 5/2008
CN 201339908 Y 11/2009

(Continued)

OTHER PUBLICATIONS

Search report of counterpart European Patent Application No. 20897820.5 issued on Aug. 3, 2022.

(Continued)

*Primary Examiner* — Ismael Negron

(57) ABSTRACT

An illuminated floor tile, includes a rear body, an LED lamp panel disposed on the rear body, and a glass cover provided over the LED lamp panel and secured to the rear body by an adhesive layer. The LED lamp panel includes a plurality of lamp beads fixedly arranged on a PCB board. The rear body includes a plurality of supports extending from a bottom hosing and through an opening of the PCB, such that a top surface of the supports is higher than the lamp beads and supports the glass.

11 Claims, 3 Drawing Sheets

(56) References Cited

U.S. PATENT DOCUMENTS 7,213,937 B2 * 5/2007 Tsai .................. G02F 1/133608 362/240
7,607,793 B2 * 10/2009 Coushaine .............. E04F 15/02 362/153.1
7,663,730 B2 * 2/2010 Shibata ............. G02F 1/133603 349/161
7,667,787 B2 * 2/2010 Mahama .............. G02B 6/0073 349/67
7,753,563 B2 * 7/2010 Parker ................. G09F 13/0409 362/330
8,061,863 B2 * 11/2011 Min .................. G02F 1/133608 362/306
8,109,644 B2 * 2/2012 Bierhuizen .......... G02B 6/0018 362/249.02
8,197,082 B2 * 6/2012 Cho .................. G02F 1/133603 362/249.02
8,430,527 B2 * 4/2013 Lai .......................... F21V 31/04 362/249.02
8,444,287 B2 * 5/2013 Hardesty ........... E04F 15/02172 362/249.02
9,192,850 B2 * 11/2015 Geith ................ E04F 15/02172
9,476,551 B2 * 10/2016 Thijssen ............... E04F 15/082
9,752,749 B2 * 9/2017 Adams ................. B60Q 1/0483
9,864,122 B2 * 1/2018 Ilmonen ............... G02B 6/0053
9,869,465 B2 * 1/2018 Van Herpen ............ E04F 15/02
10,054,285 B2 * 8/2018 Demuynck ........ G02B 19/0014
10,571,116 B2 * 2/2020 Hofer .................... E04F 13/142
11,359,804 B2 * 6/2022 Yang ..................... G09F 19/228
2007/0103902 A1 * 5/2007 Hsiao ...................... E04F 15/02 362/240
2007/0274089 A1 * 11/2007 Harris ..................... F21S 8/022 362/545
2009/0103280 A1 * 4/2009 Peard ........................ E04B 5/46 362/97.1
2012/0120325 A1 * 5/2012 Shimizu ............ G02F 1/133608 348/790
2017/0248302 A1 * 8/2017 Reithler ................ E04F 15/105
2019/0179375 A1 6/2019 Huang et al.

FOREIGN PATENT DOCUMENTS

CN 101656031 A 2/2010
CN 202012029 U 10/2011
CN 204328377 U 5/2015
CN 104867411 A 8/2015
CN 105120023 A 12/2015
CN 107146789 A 9/2017
CN 206601925 U 10/2017
CN 207572011 U 7/2018
CN 207624341 U 7/2018
CN 207731571 U 8/2018
CN 109166468 A 1/2019
CN 109935180 A 6/2019
CN 110136596 A 8/2019
CN 209283617 U 8/2019
CN 110349514 A 10/2019
CN 210691930 U 6/2020
DE 20300472 U1 5/2004
DE 102013013985 A1 * 3/2014 ............. E01C 17/00
WO 2016/087158 A1 6/2016
WO 2017/036167 A1 3/2017
WO 2019/148685 A1 8/2019

OTHER PUBLICATIONS

International Search Report of PCT Patent Application No. PCT/CN2020/134890 issued on Mar. 15, 2021.

* cited by examiner

LED ILLUMINATED FLOOR TILE WITH GLASS COVER

This application claims the priority of the Chinese patent application filed with China Patent Office on Dec. 13, 2019, with the application number of 201911284357.6 and the title of "LED FLOOR TILE SCREEN", the entire contents of which are incorporated herein by reference in their entirety.

TECHNICAL FIELD

The application belongs to the technical field of display screens, and particularly relates to an LED floor tile screen.

BACKGROUND

LED floor tile screens have the advantages of flexible installation, good load-bearing performance, easy maintenance, high contrast, uniform gray scale and good consistency. They are widely used in places or occasions such as stage, catwalk, exhibition stand, bar, night entertainment venue, broadcast hall, conference room and multimedia classroom.

The LED floor tile screen is a display screen laid on the floor, which can display the expected images more clearly and accurately. At present, the LED floor tile screen in the market is formed by covering the acrylic transparent panel on a regular LED module (composed of rear body, front body and LED lamp panel). At first, a fixing screw hole is reserved on the LED module, then an acrylic transparent panel is covered on the top surface of the LED module, and finally, the acrylic transparent panel is fixed on the LED module by screws. However, the inventor found that the existing LED floor tile screen still has the following shortcomings: a. The transparency of acrylic transparent panel is poor, and it is likely to change color under strong sunlight, which affects the display effect; b. The screws on the transparent acrylic panel are conspicuous, and when using the floor tile screen, the parts with screws or bolts would block the light, which would be shown as black spots without images on the floor tile screen, and thus seriously affecting the display effect of the floor tile screen; c. Because the screws are designed in the center of four lamps, the small distance between the lamps would inevitably require small screws, which leads to insufficient screw strength and a tendency to slide.

Technical Problems

The application provides an LED floor tile screen, and aims to solve the technical problem that the acrylic transparent panel of the existing LED floor tile screen is poor in transparency and likely to change color under strong sunlight, which affects the display effect.

Technical Solutions

The application adopts the following technical solution to solve the above technical problems: an LED floor tile screen is provided, including a rear body and an LED lamp panel fixedly arranged on the rear body; the LED lamp panel includes a PCB board and a plurality of lamp beads fixedly arranged on the PCB board; wherein the LED floor tile screen further includes a glass covering the LED lamp panel and an adhesive layer for bonding and sealing the glass and the rear body;

the rear body includes a bottom housing and a plurality of supports fixedly arranged in the bottom housing; and the support is used to support the glass; and the LED lamp panel is fixedly arranged in the bottom housing; a top surface of the support is higher than a top surface of the lamp bead.

In the above LED floor tile screen of the present application, the PCB board is provided with a first through hole, the first through hole avoids the lamp bead; and the support passes through the first through hole and abuts against the glass.

In the above LED floor tile screen of the present application, the support is a transparent support.

In the above LED floor tile screen of the present application, the adhesive layer is a transparent adhesive layer.

In the above LED floor tile screen of the present application, transparent side plates are arranged around the bottom housing.

In the above LED floor tile screen of the present application, the adhesive layer is filled between the side plate and the glass.

In the above LED floor tile screen of the present application, a side of the glass is provided with a first groove.

In the above LED floor tile screen of the present application, an upper end of an inner wall of the side plate is provided with a second groove.

In the above LED floor tile screen of the present application, the second groove is set as a zigzag groove.

In the above LED floor tile screen of the present application, the side plate includes a first segment close to the glass and a second segment fixed on a bottom surface of the first segment, the wall thickness of the first segment is smaller than that of the second segment, and an outer surface of the first segment is flat with that of the second segment; the LED lamp panel abuts against a top surface of the second segment.

In the above LED floor tile screen of the present application, one end of the support close to the glass is provided with a first post, and the first post 111 passes through the first through hole and abuts against the glass; one end of the support away from the glass is provided with a second post, and the LED lamp panel abuts against a top surface of the second post.

In the above LED floor tile screen of the present application, further including a black adhesive layer between the glass and the LED lamp panel, wherein the black adhesive layer completely covers the PCB board, and a top surface of the black adhesive layer is lower than the top surface of the lamp bead.

In the above LED floor tile screen of the present application, the LED lamp panel further includes a sensing chip fixedly arranged on the PCB board; and the sensing chip is used for sensing human behavior information on the LED floor tile screen, and the PCB board controls the display of the lamp bead according to information fed back by the sensing chip.

In the above LED floor tile screen of the present application, the rear body further includes a positioning post fixedly arranged on the bottom housing, and a positioning hole is arranged on the PCB board, and the positioning post is inserted into the positioning hole.

Beneficial Effects

The LED floor tile screen provided by the application has the following beneficial effects: compared with the prior art, the support of the LED floor tile screen in the application supports the glass, which can transmit the pressure on the glass to the rear body, thereby preventing the glass from crushing the lamp bead, protecting the lamp bead, omitting the front body structure normally used in the prior art, saving the cost and further improving the display clarity of the LED floor tile screen. At the same time, glass is used instead of acrylic transparent panel, which can avoid discoloration under sunlight, improve transparency and clarity, and make the display effect better. The support and adhesive layer are adopted, instead of using screws to fix the glass. In this way, the connection is simpler and firmer, thus avoiding the influence of insufficient strength or sliding caused by the small size of screws. Meanwhile, it plays a waterproof role and avoids damaging the electrical components in the LED floor tile screen.

Figure 1:
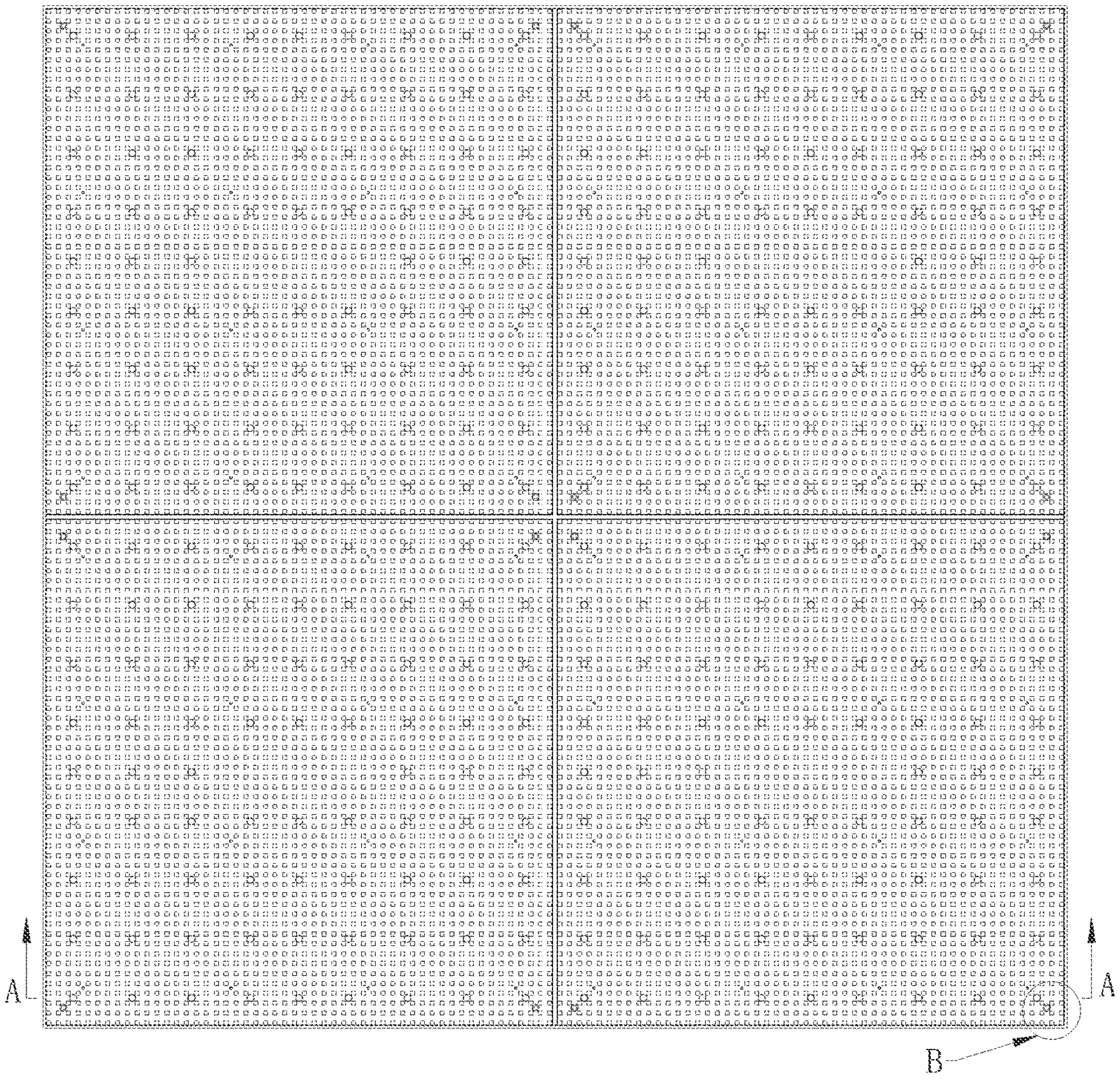
FIG. 1 is a structural schematic diagram of an LED floor tile screen provided by an embodiment of the application.
Figure 2:
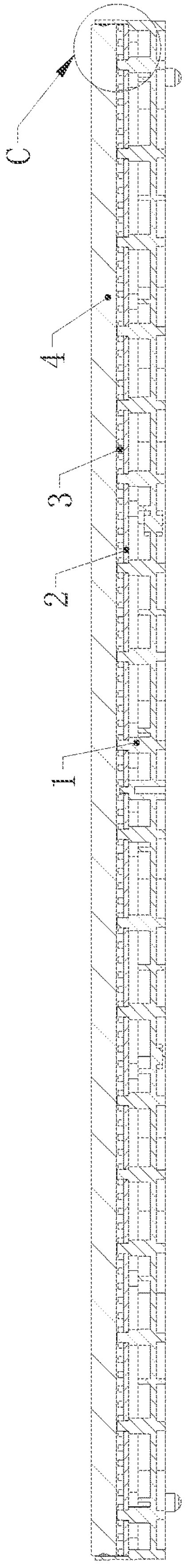
FIG. 2 is a sectional view taken along A-A of FIG. 1.

Reference signs in the description are as follows:

1. Rear body; 11. Support; 111. First post; 112. Second post;

12. Side plate; 121. First segment; 122. Second segment;

13. Second groove; 14. Positioning post;

2. LED lamp panel; 21. PCB board; 22. Lamp bead; 23. First through hole;

3. Adhesive layer;

4. Glass; 41. First groove.

DETAILED DESCRIPTION OF DISCLOSED EMBODIMENTS

In order to make the technical problems, technical solutions and beneficial effects of this application clearer, the application will be further described in detail with reference to the drawings and embodiments. It should be understood that the specific embodiments described herein are only used to illustrate the application, rather than limiting it.

As shown in FIG. 1 to FIG. 4, an LED floor tile screen provided by an embodiment of the present application, including a rear body 1 and an LED lamp panel 2 fixedly arranged on the rear body 1; the LED lamp panel 2 includes a PCB board 21 and a plurality of lamp beads 22 fixedly arranged on the PCB board 21; wherein the LED floor tile screen further includes a glass 4 covering the LED lamp panel 2 and an adhesive layer 3 for bonding and sealing the glass 4 and the rear body 1.

The rear body 1 includes a bottom housing and a plurality of supports 11 fixedly arranged in the bottom housing; the support 11 is used to support the glass 4.

The LED lamp panel 2 is fixedly arranged in the bottom housing; a top surface of the support 11 is higher than a top surface of the lamp bead 22.

The LED lamp panel 2 is first installed in the rear body 1, and the support 11 passes through the first through hole 23. Then cover the glass 4 on the support 11, and finally pour glue into the gap between the glass 4 and the side plate 12, and the glue would form an adhesive layer between the glass 4 and the side plate 12. Compared with the prior art, the LED floor tile screen provided by the application has the following benefits: the support 11 of the LED floor tile screen in the application supports the glass 4, which can transmit the pressure on the glass 4 to the rear body 1, thereby preventing the glass 4 from crushing the lamp bead 22, protecting the lamp bead 22, omitting the front body structure normally used in the prior art, saving the cost and further improving the display clarity of the LED floor tile screen. At the same time, the glass 4 is used instead of acrylic transparent panel, which can avoid discoloration under sunlight, improve transparency and clarity, and make the display effect better. The support 11 and adhesive layer 3 are adopted, instead of using screws to fix the glass. In this way, the connection is simpler and firmer, thus avoiding the influence of insufficient strength or sliding caused by the small size of screws. Meanwhile, it plays a waterproof role and avoids damaging the electrical components in the LED floor tile screen.

In an embodiment, the glass 4 is tempered glass. Tempered glass has the advantages of high strength, large bearing capacity, non-shattering, higher safety and long service life.

In an embodiment, as shown in FIG. 1 to FIG. 4, the PCB board 21 is provided with a first through hole 23 which avoids the lamp bead 22. The support 11 passes through the first through hole 23 and abuts against the glass 4. The support 11 has a better supporting effect on glass 4, and can also play a role of limiting the position of PCB board 21, which is convenient for processing and installation.

In an embodiment, the support 11 is a transparent support. The light emitted by lamp bead 22 will not be blocked, so that the black spots on the LED floor tile screen caused by light blocking can be avoided, and the display clarity is improved and the display effect is better.

In an embodiment, the supports 11 are uniformly distributed on the PCB board 21, the glass 4 is supported more evenly, so as to avoid deformation of the glass 4 caused by excessive local stress, which would crush the lamp bead 22 and affect the display effect of LED floor tile screen. Meanwhile, the PCB board 21 is more stable by the limit of support 11, thus avoiding the PCB board 21 from moving during glue filling.

In an embodiment, the adhesive layer 3 is a transparent adhesive layer. In this way, the display transparency and clarity of LED floor tile screen are improved, and it is also convenient to check the connection stability between glass 4 and rear body 1.

Figure 4:
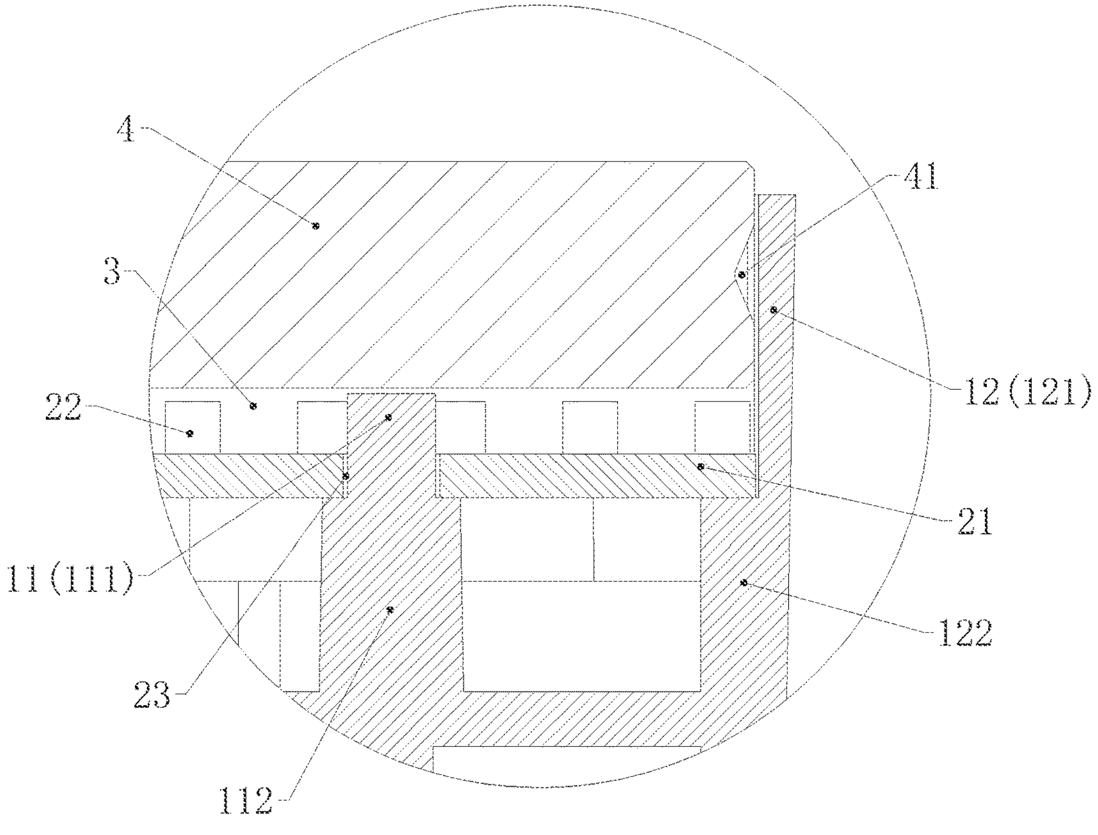
FIG. 4 is an enlarged view of C in FIG. 2.

In an embodiment, as shown in FIG. 4, transparent side plates 12 are arranged around the bottom housing. In this way, after a multiple LED floor tile screen is assembled, the transparency and clarity of the display are improved, and the light blocking at the joint of the adjacent LED floor tile screen would be avoided.

In an embodiment, as shown in FIG. 4, an adhesive layer 3 is filled between the side plate 12 and the glass 4. The adhesive firmness of glass 4 is improved, so that the glass 4 will not come loose or fall off.

In an embodiment, as shown in FIG. 4, a first groove 41 is provided on the side of the glass 4. The first groove 41 is filled with adhesive layer 3, which increases the friction between adhesive layer 3 and glass 4, improves the tensile strength of the connection of adhesive layer 3, makes glass 4 more firmly fixed, and prevents glass 4 from sliding or falling.

Figure 3:
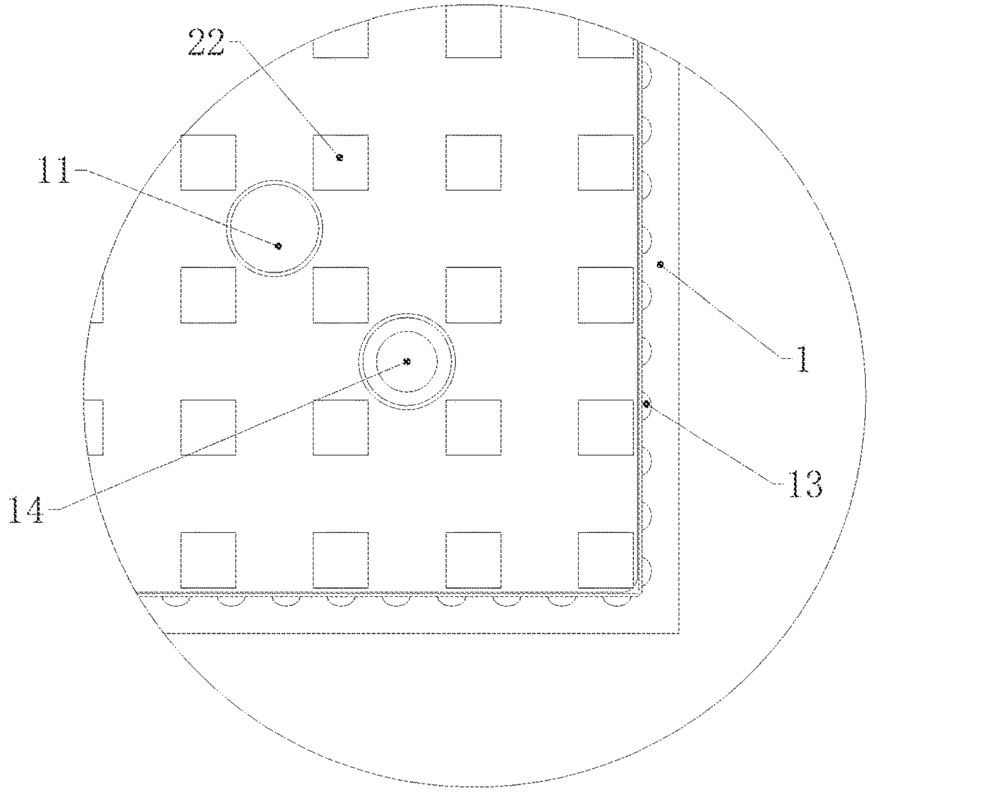
FIG. 3 is an enlarged view of B in FIG. 1.

In an embodiment, as shown in FIG. 3, the upper end of the inner wall of the side plate 12 is provided with a second groove 13. The second groove 13 is filled with adhesive layer 3, which increases the friction between adhesive layer 3 and side plate 12, improves the tensile strength of the connection of adhesive layer 3, makes glass 4 more firmly fixed, and prevents glass 4 from sliding or falling.

In an embodiment, as shown in FIGS. 3 and 4, a first groove 41 is arranged on the side of the glass 4, and a second groove 13 is arranged on the upper end of the inner wall of the side plate 12. The first groove 41 and the second groove 13 are filled with adhesive layer 3, which increases the friction between adhesive layer 3 and glass 4, and the friction between adhesive layer 3 and side plate 12, improves the tensile strength of the connection of adhesive layer 3, makes glass 4 more firmly fixed.

In an embodiment, as shown in FIG. 3, the second groove 13 is set as a zigzag groove. The tensile strength of the connection of the adhesive layer 3 is obviously improved, and the fixation of glass 4 is firmer.

In an embodiment, as shown in FIG. 1 to FIG. 4, the side plate 12 includes a first segment 121 close to glass 4 and a second segment 122 fixed on the bottom surface of the first segment 121. The wall thickness of the first segment 121 is smaller than that of the second segment 122, and the outer surface of the first segment 121 is flat with that of the second segment 122. The LED lamp panel 2 abuts against the top surface of the second segment 122, which improves the support of rear body 1 to LED lamp panel 2, makes the placement of LED lamp panel 2 more stable, and avoids the influence of glue penetration on electrical components.

In an embodiment, as shown in FIG. 1 to FIG. 4, an end of the support 11 close the glass 4 is provided with a first post 111, and the first post 111 passes through the first through hole 23.

The end of support 11 away from glass 4 is provided with a second post 112, and the LED lamp panel 2 abuts against the top surface of second post 112. In this way, the support strength of rear body 1 to LED lamp panel 2 is improved, the limit of the support 11 to LED lamp panel 2 is strengthened, the stability of connection between LED lamp panel 2 and rear body 1 is improved, and also the glue can be prevented from penetrating through first through hole 23 to affect electrical components.

In an embodiment, the cross section of first post 111 is smaller than that of first through hole 23, and the cross section of second post 112 is larger than that of first through hole 23. The abutting area between the second post 112 and the LED lamp panel 2 is increased, so as to improve the stability of the support of the second post 112.

In an embodiment, as shown in FIG. 1 to FIG. 4, a black adhesive layer is further included between the glass 4 and the LED lamp panel 2, and the black adhesive layer completely covers the PCB board 21 and the top surface of the black adhesive layer is lower than the top surface of the lamp bead 22. In this way, the lamp beam 22 can display a uniform background color, thereby preventing the color on the PCB board 21 from affecting the display effect and improving the uniformity of the display effect.

In an embodiment, as shown in FIG. 1 to FIG. 4, the rear body 1 further includes a positioning post 14 fixed on the bottom housing, and a positioning hole is provided on the PCB board 21, and the positioning post 14 extends into the positioning hole. In this way, it is convenient to install and position the LED lamp panel 2 and the rear body 1, with simple structure and convenient operation.

In an embodiment, as shown in FIG. 1 to FIG. 4, the LED lamp panel 2 further includes a sensing chip fixedly arranged on the PCB board 21. The sensing chip is used to sense human behavior information on LED floor tile screen, and the PCB board 21 controls the display of lamp bead 22 according to the information fed back by the sensing chip. The PCB board 21 controls the lamp bead 22 to switch to a corresponding display according to the information of people's actions or coordinates on LED floor tile screen sensed by the sensing chip, so as to realize the intelligent interaction between LED floor tile screen and people, and further improve the display effect of LED floor tile screen.

The above are only preferred embodiments of the present application, not intended to limit the application. Any modifications, equivalent substitutions and improvements made within the spirit and principles of the application shall be included in the protection scope of this application.

What is claimed is:

1. An illuminated floor tile, comprising:

a rear body having a bottom housing, a plurality of transparent side plates arranged around the bottom housing, and a plurality of transparent supports fixedly arranged in the bottom housing;

an LED lamp panel fixedly arranged on the rear body, the LED lamp panel including a printed circuit board (PCB) and a plurality of lamp beads fixedly arranged on the PCB, the PCB provided with a at least one first through hole;

a glass cover provided over the LED lamp panel; and an adhesive layer bonding and sealing the glass cover and the rear body, wherein the LED lamp panel is fixedly arranged in the bottom housing, at least one of the plurality of transparent supports passes through the at least first through hole and abuts against the glass cover, and a top surface of the transparent supports extend higher than a top surface of the lamp beads, such that the glass cover is supported by the plurality of transparent supports.

2. The illuminated floor tile of claim 1, wherein the adhesive layer is transparent.

3. The illuminated floor tile of claim 1, wherein at least one of the side plates comprises a first segment close to the glass cover and a second segment fixed on a bottom portion of the first segment, the first segment is thinner than the second segment, and an outer surface of the first segment coplanar with that of the second segment; the LED lamp panel abuts against a top surface of the second segment.

4. The illuminated floor tile screen of claim 1, wherein one end of at least one of the transparent supports close to the glass cover is provided with a first post, and the first post passes through the first through hole and abuts against the glass cover; one end of at least one of the transparent supports away from the glass cover is provided with a second post, and the LED lamp panel abuts against a top surface of the second post.

5. The illuminated floor tile of claim 1, further comprising a black adhesive layer between the glass cover and the LED lamp panel, wherein the black adhesive layer completely covers the PCB, and a top surface of the black adhesive layer is lower than the top surface of the lamp bead.

6. The illuminated floor tile of claim 1, wherein the LED lamp panel further comprises a sensing chip fixedly arranged on the PCB; and the sensing chip is used for sensing human behavior information on the illuminated floor tile, and the PCB is configured to control illumination of the lamp bead according to information fed back by the sensing chip.

7. The illuminated floor tile of claim 1, wherein the rear body further comprises a positioning post fixedly arranged on the bottom housing, and a positioning hole is arranged on the PCB, and the positioning post is inserted into the positioning hole.

8. The illuminated floor tile of claim 1, wherein the adhesive layer is provided between the side plates and the glass cover.

9. The illuminated floor tile of claim 8, further comprising a first groove formed on a side of the glass cover.

10. The illuminated floor tile of claim 8, further comprising a second groove formed on an upper end of an inner surface of at least one of the side plates.

11. The illuminated floor tile of claim 10, wherein the second groove has a zigzag shape.

* * * * *